(12) United States Patent
Al-Akhdar

(10) Patent No.: US 7,824,575 B2
(45) Date of Patent: Nov. 2, 2010

(54) LIQUID ANTIOXIDANT MIXTURES

(75) Inventor: Walid Al-Akhdar, Oberwil (CH)

(73) Assignee: Ciba Corporation, Tarrytown, NY (US)

( * ) Notice: Subject to any disclaimer, the term of this patent is extended or adjusted under 35 U.S.C. 154(b) by 116 days.

(21) Appl. No.: 12/221,114

(22) Filed: Jul. 31, 2008

(65) Prior Publication Data

US 2009/0032769 A1     Feb. 5, 2009

Related U.S. Application Data

(60) Provisional application No. 60/962,837, filed on Aug. 1, 2007.

(51) Int. Cl.
| | |
|---|---|
| *C09K 15/26* | (2006.01) |
| *C09K 15/30* | (2006.01) |
| *C09K 15/16* | (2006.01) |
| *C09K 15/06* | (2006.01) |

(52) U.S. Cl. .................. 252/402; 252/401; 252/404; 252/405; 252/406; 252/407

(58) Field of Classification Search ............... 252/401, 252/402, 404, 405, 406, 407
See application file for complete search history.

(56) References Cited

U.S. PATENT DOCUMENTS

| | | | | |
|---|---|---|---|---|
| 4,207,229 | A * | 6/1980 | Spivack | 524/101 |
| 4,228,297 | A | 10/1980 | Haeberli et al. | 560/75 |
| 4,233,208 | A * | 11/1980 | Spivack | 524/149 |
| 4,824,601 | A | 4/1989 | Franklin | 252/401 |
| 7,419,564 | B2 * | 9/2008 | Henke et al. | 156/275.7 |
| 2006/0040833 | A1 * | 2/2006 | Al-Akhdar et al. | 508/459 |
| 2006/0162860 | A1 * | 7/2006 | Henke et al. | 156/327 |
| 2006/0167209 | A1 * | 7/2006 | Ostrowski et al. | 528/85 |
| 2007/0185250 | A1 | 8/2007 | Mader et al. | 524/287 |

* cited by examiner

*Primary Examiner*—Joseph D Anthony
(74) *Attorney, Agent, or Firm*—Tyler A. Stevenson

(57) ABSTRACT

The present invention provides for liquid antioxidant mixtures of octylated/butylated diphenylamine, phenothiazine and octadecyl (3,5-di-tert-butyl-4-hydroxyphenyl)-propionate. The antioxidant mixtures are useful for polyurethane stabilization.

9 Claims, No Drawings

LIQUID ANTIOXIDANT MIXTURES

This application claims benefit of U.S. provisional app. No. 60/962,837, filed Aug. 1, 2007, the contents of which are incorporated herein by reference.

The present invention is aimed at a liquid mixture of specific antioxidant additives for plastics. The antioxidants are octylated/butylated diphenylamine, phenothiazine and octadecyl (3,5-di-tert-butyl-4-hydroxyphenyl)-propionate. The liquid antioxidant mixture is useful for the stabilization of polyurethane.

BACKGROUND

Octylated/butylated diphenylamine is a known antioxidant for a variety of organic materials. This is taught for example in U.S. Pat. No. 4,824,601.

Phenothiazine is a known antioxidant for organic materials.

Octadecyl (3,5-di-tert-butyl-4-hydroxyphenyl)-propionate is a well known phenolic antioxidant for organic materials. This is disclosed for example in U.S. Pat. No. 4,228,297.

Liquid mixtures of antioxidant packages are desirable for plastics manufacturing purposes. Two part mixtures of octylated/butylated diphenylamine and phenothiazine are not stable liquids under ambient conditions. Surprisingly, it has been found that addition of low levels of the further antioxidant octadecyl (3,5-di-tert-butyl-4-hydroxyphenyl)-propionate allow the mixture to be liquid at certain temperatures.

SUMMARY

Disclosed is a liquid antioxidant mixture comprising
octylated/butylated diphenylamine,
phenothiazine and
octadecyl (3,5-di-tert-butyl-4-hydroxyphenyl)-propionate.

Also disclosed is a method for providing a liquid antioxidant mixture,
which method comprises
adding octadecyl (3,5-di-tert-butyl-4-hydroxyphenyl)-propionate to a two part mixture of octylated/butylated diphenylamine and phenothiazine and stirring and
optionally heating the mixture.

DETAILED DISCLOSURE

The preparation of octylated/butylated diphenylamine is disclosed for example in U.S. Pat. No. 4,824,601, the disclosure of which is incorporated by reference. It is the reaction product of diphenylamine with diisobutylene (2,4,4-trimethylpentene). The structure is:

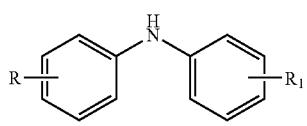

where R and $R_1$ are independently H, $C_4H_9$ or $C_8H_{17}$. This compound mixture is a liquid at room temperature.

Phenothiazine is commercially available, for example from Sigma-Aldrich. It is:

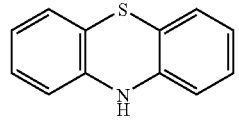

Phenothiazine has a melting point of 182-187° C.

Octadecyl (3,5-di-tert-butyl-4-hydroxyphenyl)-propionate is:

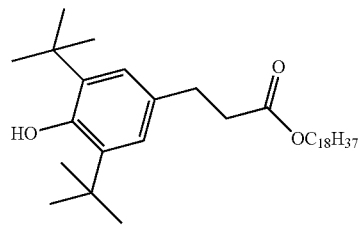

The preparation of octadecyl (3,5-di-tert-butyl-4-hydroxyphenyl)-propionate is disclosed in for example U.S. Pat. No. 4,228,297, the disclosure of which is hereby incorporated by reference. Octadecyl (3,5-di-tert-butyl-4-hydroxyphenyl)-propionate has a melting point of 50-55° C.

The three part antioxidant mixtures are liquid for example at ambient temperature and pressure. The mixtures are liquid for example from about 25° C. to about 60° C. at ambient pressure. The mixtures are liquid for example from about 40° C. to about 60° C. at ambient pressure.

Ambient conditions are about 25° C. and about 1 atmosphere of pressure.

Disclosed is a liquid antioxidant mixture comprising
from about 74.4 to about 79.0 weight percent octylated/butylated diphenylamine,
from about 3.0 to about 3.6 weight percent phenothiazine and
from about 18.0 to about 22.0 weight percent octadecyl (3,5-di-tert-butyl-4-hydroxyphenyl)-propionate,
where the total weight of antioxidants is 100%.

The liquid antioxidant mixture in particular comprises
about 76.7 weight percent octylated/butylated diphenylamine,
about 3.3 weight percent phenothiazine and
about 20.0 weight percent octadecyl (3,5-di-tert-butyl-4-hydroxyphenyl)-propionate.

Also disclosed is a liquid antioxidant mixture comprising
from about 84.8 to about 87.5 weight percent octylated/butylated diphenylamine,
from about 3.4 to about 4.1 weight percent phenothiazine and
from about 9.1 to about 11.1 weight percent octadecyl (3,5-di-tert-butyl-4-hydroxyphenyl)-propionate,
where the total weight of antioxidants is 100%.

The liquid antioxidant mixture in particular comprises
about 86.2 weight percent octylated/butylated diphenylamine,
about 3.8 weight percent phenothiazine and
about 10.0 weight percent octadecyl (3,5-di-tert-butyl-4-hydroxyphenyl)-propionate.

Also disclosed is a liquid antioxidant mixture comprising
from about 89.2 to about 91.2 weight percent octylated/butylated diphenylamine,
from about 3.5 to about 4.3 weight percent phenothiazine and
from about 5.3 to about 6.5 weight percent octadecyl (3,5-di-tert-butyl-4-hydroxyphenyl)-propionate,
where the total weight of antioxidants is 100%.

The liquid antioxidant mixture in particular comprises
about 90.3 weight percent octylated/butylated diphenylamine,
about 3.9 weight percent phenothiazine and
about 5.8 weight percent octadecyl (3,5-di-tert-butyl-4-hydroxyphenyl)-propionate.

EXAMPLES

Formulation 1: 115 g of octylated/butylated diphenylamine
5 g of phenothiazine
30 g of octadecyl (3,5-di-tert-butyl-4-hydroxyphenyl)-propionate
The mixture is stirred with heating. The resultant liquid is stable at 40° C.

Formulation 2: 115 g of octylated/butylated diphenylamine
5 g of phenothiazine
13.5 g of octadecyl (3,5-di-tert-butyl-4-hydroxyphenyl)-propionate
The mixture is stirred with heating. The resultant liquid is stable is 60° C.

Formulation 3: 115 g of octylated/butylated diphenylamine
5 g of phenothiazine
7.5 g of octadecyl (3,5-di-tert-butyl-4-hydroxyphenyl)-propionate
The mixture is stirred with heating. The resultant liquid is stable is 60° C.

The term "stable" means that the liquid remains a liquid over a period of at least 4 days at the specified temperature. The liquid does not crystallize upon being subjected to a shock.

The viscosity of Formulation 1 is measured on a Brookfield Viscosity meter, spindle 31.

| Tempurature | Speed | Viscosity | Dial | Factor |
|---|---|---|---|---|
| 60° C. | 30 | 43 | 4.3 | 10 |
| 59.9° C. | 60 | 43 | 8.6 | 5 |
| 39.9° C. | 30 | 160 | 16 | 10 |
| 40° C. | 60 | 163 | 32.6 | 5 |

What is claimed is:

1. A liquid antioxidant mixture comprising
from about 74.4 to about 79.0 weight percent octylated/butylated diphenylamine,
from about 3.0 to about 3.6 weight percent phenothiazine and
from about 18.0 to about 22.0 weight percent octadecyl (3,5-di-tert-butyl-4-hydroxyphenyl)-propionate,
where the total weight of antioxidants is 100%.

2. A liquid mixture according to claim 1 comprising
about 76.7 weight percent octylated/butylated diphenylamine,
about 3.3 weight percent phenothiazine and
about 20.0 weight percent octadecyl (3,5-di-tert-butyl-4-hydroxyphenyl)-propionate.

3. A liquid mixture according to claim 1 that is stable at about 40° C.

4. A liquid antioxidant mixture comprising
from about 84.8 to about 87.5 weight percent octylated/butylated diphenylamine,
from about 3.4 to about 4.1 weight percent phenothiazine and
from about 9.1 to about 11.1 weight percent octadecyl (3,5-di-tert-butyl-4-hydroxyphenyl)-propionate,
where the total weight of antioxidants is 100%.

5. A liquid antioxidant mixture according to claim 4 comprising
about 86.2 weight percent octylated/butylated diphenylamine,
about 3.8 weight percent phenothiazine and
about 10.0 weight percent octadecyl (3,5-di-tent-butyl-4-hydroxyphenyl)-propionate.

6. A liquid antioxidant mixture according to claim 4 that is stable at about 60° C.

7. A liquid antioxidant mixture comprising
from about 89.2 to about 91.2 weight percent octylated/butylated diphenylamine,
from about 3.5 to about 4.3 weight percent phenothiazine and
from about 5.3 to about 6.5 weight percent octadecyl (3,5-di-tert-butyl-4-hydroxyphenyl)-propionate,
where the total weight of antioxidants is 100%.

8. A liquid antioxidant mixture according to claim 7 comprising
about 90.3 weight percent octylated/butylated diphenylamine,
about 3.9 weight percent phenothiazine and
about 5.8 weight percent octadecyl (3,5-di-tert-butyl-4-hydroxyphenyl)-propionate.

9. A liquid antioxidant mixture according to claim 7 that is stable at about 60° C.

* * * * *